United States Patent [19]

Bergman

[11] 4,192,427
[45] Mar. 11, 1980

[54] TOW TRUCK LIGHT SUPPORT

[76] Inventor: William D. Bergman, 5538 N. 25th st., Kalamazoo, Mich. 49001

[21] Appl. No.: 899,480

[22] Filed: Apr. 24, 1978

[51] Int. Cl.² .............................................. B60Q 1/46
[52] U.S. Cl. .................................... 212/8 R; 340/87; 362/61; 362/66
[58] Field of Search ........................... 362/61, 66, 74; 248/291, 293; 212/8 R; 414/563; 340/87

[56] References Cited

U.S. PATENT DOCUMENTS 3,229,945 1/1966 Hartman ............................ 362/74 X
3,331,957 7/1967 Adams et al. ........................ 362/61

Primary Examiner—Robert G. Sheridan
Attorney, Agent, or Firm—Blanchard, Flynn, Thiel, Boutell & Tanis

[57] ABSTRACT

Retractable means for supporting light and other equipment on an automotive service truck. There is provided for use with an automotive service truck retractable means by which warning lights, radio antenna and/or other devices may be alternately supported in raised operative position or if desired temporarily dropped into a lowered position for enabling the service truck to enter through door openings or under ceilings of reduced height such as often exists in parking garages. The supporting means for said lights, radio antenna and other devices are mounted on suitable bases which in turn are mounted on a rotative rod. Stop means are provided for limiting movement of said bases in a device lifting direction and handle means are provided for operatively rotating said rod to effect such lifting. Said handle means also function at least in part as spring means for maintaining said bases under pressure against said stop means.

5 Claims, 5 Drawing Figures

TOW TRUCK LIGHT SUPPORT

FIELD OF THE INVENTION

The invention relates to mounting means for warning lights and other devices used in an automotive service truck and particularly to such means which are positionable in a first position for holding said lights and other devices in normal raised operating position and for manually retracting same from said raised position into a lowered position.

BACKGROUND OF THE INVENTION

In the mounting of lights, radio antenna or other devices on an automotive service truck, it is conventional to mount same at a raised level on said truck for maximum visibility when said truck is moving along a highway. However, the presence of such lights, radio antenna or other devices in such relatively high position will often prevent a service truck bearing same from entering into locations of restricted height such as parking garages or ramps.

This problem has long been recognized and a number of devices have been offered for making it possible temporarily to remove such lights, radio antenna or other devices from such raised operating position in order to permit the truck to enter areas of relatively low clearance. However, insofar as I am aware, the prior known devices have not had the desired level of convenience, particularly in that they have usually required a substantial amount of disassembly in connection with such temporary removal of said lights, radio antenna or other devices. Since this is undesirably time consuming, trucks whose lights are mounted in this manner have normally not found it feasible to accept calls into such locations of low clearance resulting in both inconvenience to owners of cars stranded therein and loss of business to the owners of such trucks.

Accordingly, the objects of the invention include:

1. To provide a simple and efficient mounting means for mounting the lights, radio antenna or other devices on a service truck for convenient positioning either in a raised position of use or a lowered position for diminishing the overall vertical height of the truck.

2. To provide a device, as aforesaid, in which the changing of the lights, radio antenna and other devices from one position to the other can be accomplished quickly and easily by a single operator in not more than a minute or two of time.

3. To provide a device, as aforesaid, which can be of sufficient simplicity as to be capable of manufacture and installation on a service truck at a minimum of additional expense.

4. To provide a device, as aforesaid, in which when in the raised position for display or use of the lights, radio antenna or other devices, same will be firm, reliable and nonrattling.

5. To provide a device, as aforesaid, which will be of extreme simplicity and virtually foolproof in operation.

6. To provide a device, as aforesaid, which will be extremely sturdy and will be capable of long and reliable use without repair or other attention.

Other objects and purposes of the invention will be apparent to persons acquainted with devices of this general type upon reading the following disclosure and inspection of the accompanying drawings.

DETAILED DESCRIPTION

Figure 1:
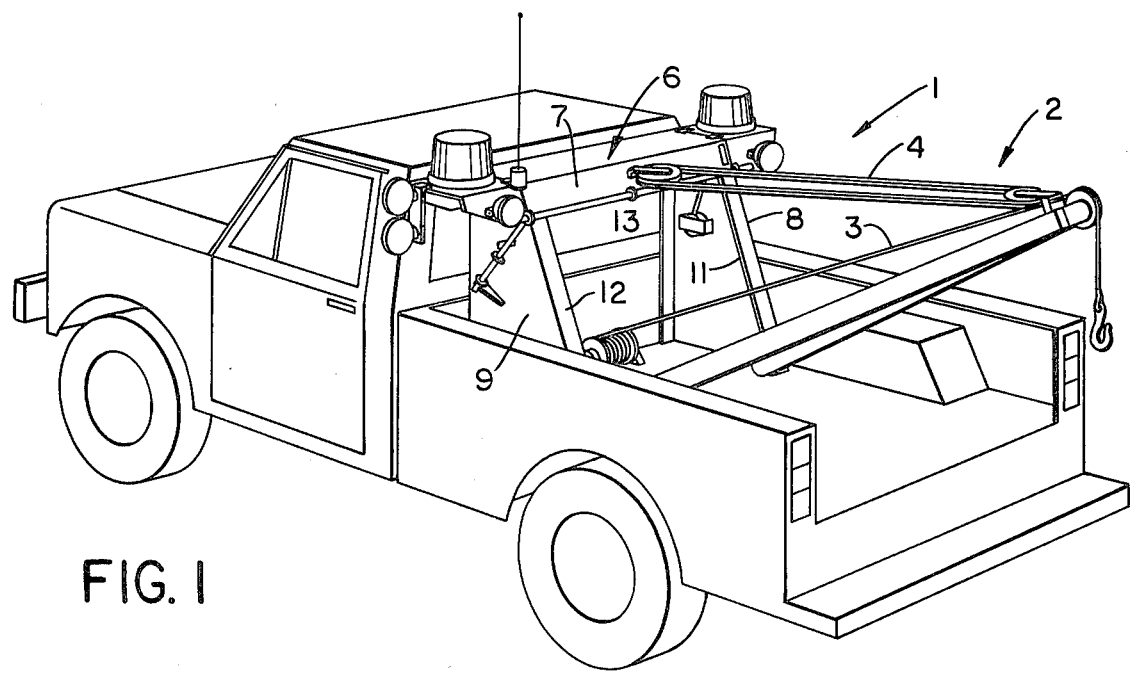
FIG. 1 is an oblique view from a rearward angle of a service truck fitted with an embodiment of the invention.

Referring to the drawings, there is shown a service truck 1 of conventional construction having a conventional lift mechanism 2 pivotally fixed to the bed of the truck carrying a suitably operated lift cable 3 and provided with appropriate, usually power actuated, means 4 for controlling the angle of the lift mechanism 2. Said latter means is mounted upon a generally horizontal top member 6 often having a depending flange 7 at the rearward side thereof for strengthening purposes and mounted for support upon a pair of end members 8 and 9. Said end members are normally provided with flanges of which three thereof appear at 11, 12 and 13 for strengthening purposes.

All of the foregoing is conventional service truck design and forms no part of the invention by itself but is incorporated cooperatively with the mounting means for the lights, radio antenna or other devices hereinafter further described.

Turning now to the details of the present invention, there is provided mounting means 15 comprising a platform, or base plate, 16 having in this case a forward depending flange 17 and a rearward depending flange 18. Said flanges function in part to stiffen the platform 16 and also for the purposes appearing hereinafter. Said rearward flange 18 is fixed as by welding to a torsion bar 19 which is in turn rotatably mounted to the rearward flange 7 of the lift mechanism supporting structure. Said pivotal mounting may be of any convenient means but may advantageously be accomplished by providing a series of rings 21, 22 and 23 which encircle said torsion rod 19 and are fixed as by welding to said rearward flange 7. Stop means, as a pair of tabs 26 and 27, are affixed as by welding to the top member 6 and extend over the platform 16 for limiting upward movement thereof, i.e., limiting clockwise rotation of said mounting base 15 on and around the torsion rod 19.

An operating handle 28 is provided rigidly on the end of the torsion rod 19 and in the raised position of the mounting means 15 said handle extends downwardly, preferably also forwardly, along the side of one of the lift mechanism supports, as the end member 9. A catch 29 is provided on said end member 9, said catch having a ramp 31 along its outer edge and a retaining notch 32 therein. The proportions of the structure are such that when the handle 28, torsion rod 19 and mounting means 15 are rotated clockwise sufficiently to enable said handle 28 to enter into the notch 32, the platform 16 will bear against the tabs 26 and 27 with sufficient pressure to hold the entire system firmly in a nonrattling condition.

As is apparent in the drawings, the devices to be mounted may then be mounted as desired on the platform 16, here a large flashing light 33, a bracket 34 carrying a pair of service lights 36 and 37 and a further bracket 41 carrying a radio antenna 42.

Figure 2:
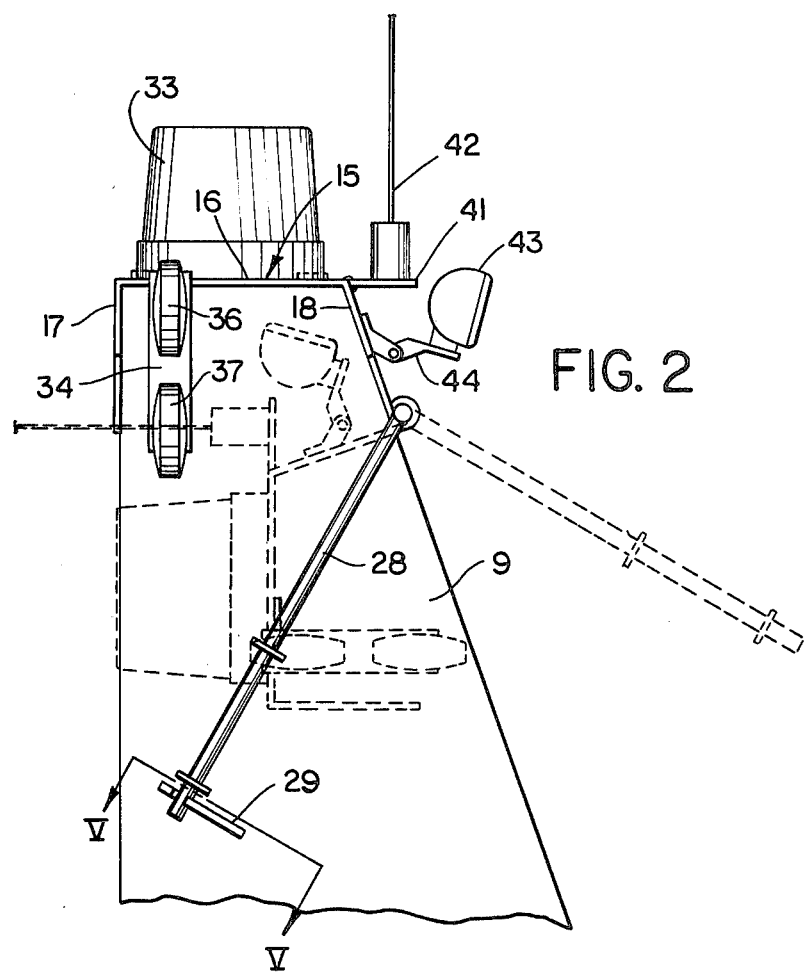
FIG. 2 is a side view of the embodiment of the invention shown in FIG. 1 showing same in solid lines in the raised position of use and in broken lines in the retracted position.
Figure 3:
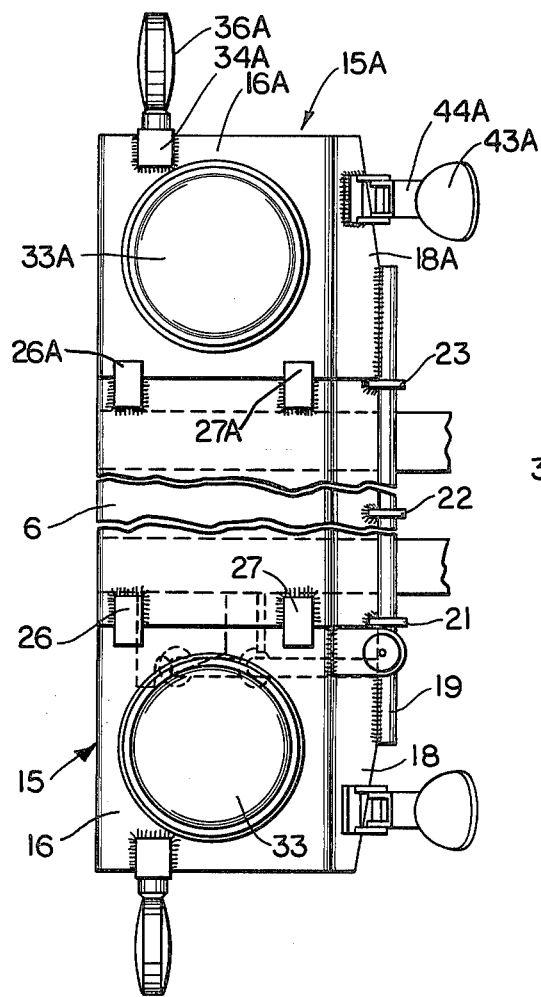
FIG. 3 is a broken top view of said embodiment of the invention.
Figure 4:
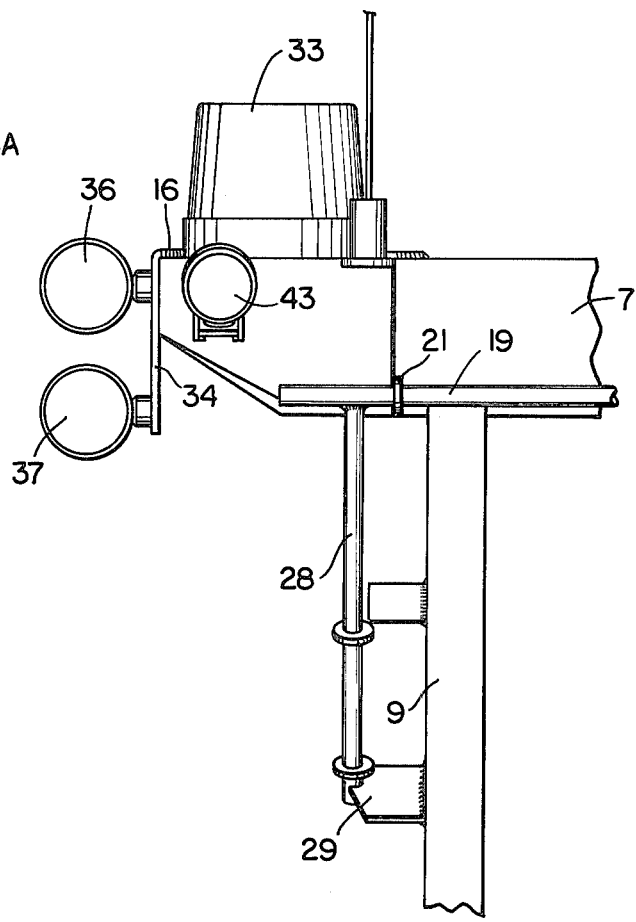
FIG. 4 is a partial rearward view thereof.
Figure 5:
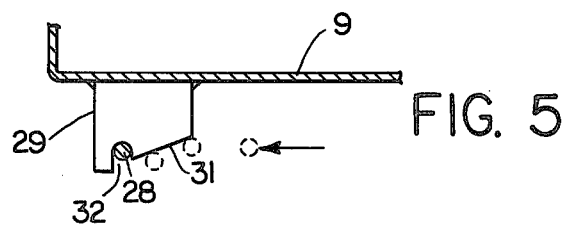
FIG. 5 is a section taken on the line V—V of FIG. 2.

The solid lines in FIG. 2 show the structure in its normal position of use with the service lights and flashing light in normal position of operation. However, if the handle 28 is unhooked from the notch 32, the same may without further manipulation be permitted to drop into the position shown by the broken lines in FIG. 2 in which all of said means, particularly the flashing light 33 and the radio antenna 42 are lowered out of a position from which they could interfere with a low ceiling. Upon reemerging from the location of such low ceiling, such as emerging from a parking garage, it is necessary only to move the handle 28 forwardly along the ramp 31 and into the notch 32 and all of the equipment mounted on said mounting means 15 is returned to its normal operating position.

A further mounting device 15A is also provided at the other end of the top member 6 and parts associated therewith. Said mounting device 15A is a mirror image of the mounting device 15 and it is provided with stops and is affixed to the torsion bar 19 all in the same manner as already described for the mounting device 15. Thus, the several parts of the mounting device 15A are identified with the same numbers as those already used in connection with the mounting device 15 together with the letter "A" associated therewith and further description of the mounting device 15A will be unnecessary.

It will be recognized that the mounting means of the invention may be used for the support of any other desired device, such as a spotlight, which it is desired to have in a raised operative position but easily though temporarily retracted to a lowered position. Further, it will be understood that the selection of the particular devices herein shown, while being the devices for which the invention was specifically designed, are in the broader sense illustrative and not limiting.

A rearwardly directed light 43 may also be mounted by means of a bracket 44 on the rearward flange 18 of the mounting device 15 if desired.

It will be apparent that while for illustrative purposes the platform 16, to which the various components comprising the invention are mounted, is here considered to be a part of the service truck construction, it is also possible for said platform 16 to constitute a separable base plate for the components comprising the invention and, as a base plate, to be removably, as by bolts, mounted onto whatever portion of the truck structure is desired. In this manner, the assembly may be mounted onto and removed from the service truck as a unit and may be mounted on portions of the truck other than the support means for a lift mechanism as desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Mounting means for devices such as lights or radio antenna for a service truck, comprising:
   a base plate;
   a torsion bar extending along said base plate and rotatable with respect thereto;
   a handle operatively associated with said torsion bar and catch means for selectively holding and releasing said handle in or from a predetermined position with respect to said base plate;
   at least one mounting means, same including a platform rigidly fixed to said torsion bar and said platform being alignable substantially parallel with said base plate;
   at least one stop fixed with respect to said base plate for limiting upward movement of said platform, the positioning of said stop being so related to the positioning of said catch means that when rotation of said torsion bar is stopped by said stop and said handle is in said catch means a substantial degree of tension will exist within the system comprising the handle, torsion bar and mounting means so as to hold same in a nonrattling condition;
   means for mounting selected devices, as warning lights, service lights or radio antenna onto said mounting means;
   whereby when said handle is positioned in said catch means, the platform of said mounting means is substantially parallel with the upper surface of said base plate and fixed with respect to said stop and said handle may be removed from said catch means and the entire system rotated to move said devices out of their raised position.

2. Mounting means for devices such as lights or radio antenna for a service truck, said service truck having lift mechanism support means including a pair of end members upstanding from the bed of the truck and a top member supported on said end members, comprising:
   a torsion bar extending along said top member and rotatable with respect thereto;
   a handle operatively associated with said torsion bar and catch means for selectively holding and releasing said handle in or from a predetermined position;
   a pair of device mounting means each comprising a platform and a depending rearward flange rigidly fixed to opposite ends of said torsion bar and at least the platforms of each thereof alignable in substantial parallelism with said top member;
   stops fixed with respect to opposite ends of said top member for limiting upward movement of said platforms, positioning of said stops being so related to the positioning of said catch means that when said platforms are fixed with respect to said stops and said handle is in said catch means, a substantial degree of tension will exist within the system comprising the handle, torsion bar and mounting means so as to hold same in a nonrattling condition;
   means for mounting selected devices, as warning lights, service lights or radio antenna onto said mounting means;
   whereby when said handle is positioned in said catch means, the platform of said mounting means is substantially parallel with said top member and fixed with respect to said stops and said handle may be removed from said catch means and the entire system rotated to move said devices out of their raised position.

3. The device of claim 2 wherein said stops are mounted on an upper portion of said top member said catch means is mounted on one of said end members for setting up a torsion system between said catch means and said stops.

4. The device of claim 2 wherein said catch means is provided with a handle retaining notch and a ramp guiding said handle to said notch.

5. The device of claim 2 including also brackets fixed to at least one of said mounting means for the support of auxiliary devices such as service lights.

* * * * *